United States Patent
Mahoney et al.

(10) Patent No.: US 8,365,135 B2
(45) Date of Patent: Jan. 29, 2013

(54) COMPUTER METHOD AND APPARATUS FOR CONNECTION CREATION IN A SOFTWARE MODELING SYSTEM

(75) Inventors: Cherie L. Mahoney, Ottawa (CA); Steven R. Shaw, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1814 days.

(21) Appl. No.: 11/260,936

(22) Filed: Oct. 27, 2005

(65) Prior Publication Data

US 2007/0101321 A1 May 3, 2007

(51) Int. Cl.
G06F 9/44 (2006.01)
G06F 3/00 (2006.01)
G06F 15/177 (2006.01)

(52) U.S. Cl. ........ 717/100; 717/104; 717/105; 717/106; 715/733; 715/734

(58) Field of Classification Search ......................... None
See application file for complete search history.

(56) References Cited

U.S. PATENT DOCUMENTS

| | | | |
|---|---|---|---|
| 5,630,080 A | 5/1997 | Malamud et al. | |
| 5,742,848 A * | 4/1998 | Burgess | 719/315 |
| 5,835,758 A | 11/1998 | Nochur et al. | |
| 5,838,973 A * | 11/1998 | Carpenter-Smith et al. | 717/105 |
| 5,872,973 A * | 2/1999 | Mitchell et al. | 719/332 |
| 6,272,672 B1 * | 8/2001 | Conway | 717/107 |
| 6,366,300 B1 * | 4/2002 | Ohara et al. | 715/771 |
| 6,405,364 B1 * | 6/2002 | Bowman-Amuah | 717/101 |
| 6,467,081 B2 * | 10/2002 | Vaidyanathan et al. | 717/123 |
| 6,701,513 B1 * | 3/2004 | Bailey | 717/109 |
| 6,701,517 B1 | 3/2004 | Moore et al. | |
| 6,742,175 B1 * | 5/2004 | Brassard | 717/107 |
| 6,823,495 B1 * | 11/2004 | Vedula et al. | 715/805 |

(Continued)

FOREIGN PATENT DOCUMENTS

EP 1 365 320 A1 11/2003

OTHER PUBLICATIONS

Ákos Lédeczi et al., "Composing Domain-Specific Design Environments", [Online], IEEE 2001, pp. 44-51, [Retrieved from Internet on Sep. 16, 2012], <http://repository.escherinstitute.org/Plone/tools/suites/mic/gme/2001Composing DomainSpecificDesignEnvironments.pdf>.*

(Continued)

*Primary Examiner* — Thuy Dao
*Assistant Examiner* — Ziaul A Chowdhury
(74) *Attorney, Agent, or Firm* — Hamilton, Brook, Smith & Reynolds, P.C.

(57) ABSTRACT

A user interface for creating relationships between visual modeling (e.g., UML) elements on a diagram is disclosed. The user interface utilizes two connector handles that represent "source to target" and "target to source" relationships. The connector handles are consistent across all shapes/elements in the diagram and are made to appear on the edge of an element shape nearest to the cursor. The source to target connector handle is used for gestures involving outgoing connections. The target to source connector handle is used for gestures involving incoming connections. The user creates a new relationship between a source and a target by selecting one of the connector handles on the source shape and dragging to the target context (element shape or blank area). Next the user is prompted to qualify the gesture by selecting from a menu the type of relationship desired to be created. A connection or edges in the diagram of the type representative of the user's selections is produced.

20 Claims, 6 Drawing Sheets

U.S. PATENT DOCUMENTS

| | | | | |
|---|---|---|---|---|
| 6,836,275 | B1* | 12/2004 | Arquie et al. | 715/734 |
| 6,986,120 | B2* | 1/2006 | Reddy et al. | 717/104 |
| 7,017,123 | B2* | 3/2006 | Chickles et al. | 715/816 |
| 7,240,328 | B2* | 7/2007 | Beckett et al. | 717/113 |
| 7,370,315 | B1* | 5/2008 | Lovell et al. | 717/100 |
| 7,464,366 | B2* | 12/2008 | Shukla et al. | 717/100 |
| 7,490,314 | B2* | 2/2009 | Yuknewicz et al. | 717/105 |
| 7,496,886 | B2* | 2/2009 | Puttaswamy et al. | 717/101 |
| 7,890,868 | B2* | 2/2011 | Shah et al. | 715/733 |
| 2002/0080157 | A1 | 6/2002 | Chickles et al. | |
| 2002/0145629 | A1 | 10/2002 | Gabbert et al. | |
| 2004/0032429 | A1* | 2/2004 | Shah et al. | 345/771 |
| 2004/0085367 | A1* | 5/2004 | Hagarty, Jr. | 345/854 |
| 2004/0243931 | A1* | 12/2004 | Stevens et al. | 715/513 |
| 2004/0252119 | A1* | 12/2004 | Hunleth et al. | 345/440 |
| 2005/0132326 | A1* | 6/2005 | Chischportich et al. | 717/106 |
| 2007/0101321 | A1* | 5/2007 | Mahoney et al. | 717/168 |
| 2008/0270977 | A1* | 10/2008 | Nucci et al. | 717/105 |
| 2010/0050152 | A1* | 2/2010 | Gilboa | 717/106 |

OTHER PUBLICATIONS

L. Davis, et al., "The Impact of Component Architectures on Interoperability" [Online], 2002, pp. 1-25, [Retrieved from Internet on Sep. 16, 2012], <http://citeseerx.ist.psu.edu/viewdoc/download-?doi=10.1.1.108.9659&rep=rep1&type=pdf>.*

Karl Johan Åström et al., "Evolution of Continuous-Time Modeling and Simulation" [Online], Jun. 1998, pp. 1-10, [Retrieved from Internet on Sep. 16, 2012], <https://www.modelica.org/publications/index_html/papers/esm98his.pdf>.*

H.J. Burckhart et al., "Connection DCS DAQ in ATLAS" [Online], Nov. 1999, pp. 1-5, [Retrieved from Internet on Sep. 16, 2012], <http://citeseerx.ist.psu.edu/viewdoc/download?doi=10.1.1.184.3254&rep=rep1&type=pdf>.*

"Drag-Drop Technique for Connecting Source and Target Objects in an Application Builder Environment," *IBM Technical Disclosure Bulletin* 36(08):365-366, Aug. 1993.

* cited by examiner

COMPUTER METHOD AND APPARATUS FOR CONNECTION CREATION IN A SOFTWARE MODELING SYSTEM

BACKGROUND OF THE INVENTION

In the art of computer programming, there are various tools to assist with the designing of a software program (e.g. application program). One category of such program design tools is the visual modeling type. The UML is an example visual modeling language (with formal syntax and semantics) for communicating a model or conceptionalization. The modeling language specification specifies modeling elements, notation and usage guidelines and not order of activities, specification of artifacts, repository interface, storage, run-time behavior and so forth.

In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

One of the problems with many visual modeling applications is that they are difficult to use. A palette often provides the possible tools that can be used to create shapes and connectors. This requires the user to constantly be going back and forth between the palette and the drawing surface. It is also difficult to provide hints as to what types of things the user should be creating (e.g., what types of connectors should go between certain shapes). The user, especially those new to UML, effectively play a guessing game as to which connections are legitimate between UML elements on the working diagram.

Existing modeling tools (i.e., ArgoUML) have some solutions for this in the form of connector handles around a shape from which new connectors can be created. The typical implementation has a set of connector handles each representing a different semantic relationship type for the user to create. The problem is that for shapes that support a lot of relationships, the border of the shape can get quite cluttered. This leads to some usability issues which ironically is what the connector handles are trying to solve. First, when the handles are invoked, this creates an "explosion" of handles around the shape which can cause the user to be inhibited by the choices available. Often the user won't understand the symbolic meaning of the handles and just know that a relationship needs to be created. The assumption is that the user has expert level domain knowledge of the relationships and what the relationships mean.

For different types of elements, the handles that are available around the shape change because different elements may support different types of relationships as a source. This means that the user interface (UI) for the handles becomes inconsistent across shapes and semantic domains. As a result the user does not gain a familiarity of the UI across all shapes and needs to learn the available handles and positions on a per shape basis.

Another issue is that typically these handles are only available for source to target relationship creation. This is assuming that the user only considers creation of relationships in this manner. If a user is thinking contextual to the target and who may consume the capabilities of this target, the user's mouse cursor is probably hovering over that shape. However, if the user now wishes to create a relationship to the target, the user must navigate his mouse/cursor to the source shape, invoke the handles and then draw the relationship. This partially defeats the purpose of the handles in that it is forcing movement of the mouse when a contributor to the relationship was literally under hand! A similar issue is if the target of the mouse cursor is on the opposite side of the source shape from the connector handle, the user is required to move the cursor across the source shape to the connector handle and drag across the source shape to the target. This feels awkward since the source shape effectively gets in the way of the gesture and forces redundant mouse/cursor movement.

SUMMARY OF THE INVENTION

The present invention provides a solution to the above issues and addresses the problems of the prior art.

Instead of many connector handles for each type of relationship, the present invention offers two handles consistently that represent "source to target" creation and "target to source" creation. These two handles (or indicators) are consistent across all shapes in a work diagram and appear to hover nearest to the mouse cursor on the shape edge. The user selects a handle and drags the selected handle to the target context (element shape or blank diagram area). On drag completion, the user is prompted to qualify the gesture (i.e., ask for specific connection type based on the target context and/or the specific target type).

In a preferred embodiment, the invention method and apparatus provide indications of a potential source-to-target connection and a potential target-to-source connection between elements in a subject software program being designed in a visual modeling system. In particular, the invention displays a source-to-target handle and a target-to-source handle. The handles are displayed together (as appropriate) through the user graphical interface in response to the cursor hovering near any one of the plurality of elements in the work diagram. Each handle enables production of an associated connection. In response to the user selecting one of the displayed handles, the invention method/apparatus provides a prompt to the user to qualify use of the selected handle (i.e., define associated connection) with respect to the one element. The prompt preferably is menu-based. In accordance with the user's specifications (e.g., menu selections), the invention method/apparatus defines a relationship with the one element and produces a pertinent connection (e.g., edges) that represents the defined relationship in the work diagram.

Some additional functionality in other embodiments include:
  a user can create a connection from a source/target to a
    blank space on the subject work diagram and the invention system prompts the user for the element type to be
    used at the other end of the connection.
  a user may double click on handles to expand shapes (program elements) on the work diagram by relationship
    type.
Accordingly, the benefits of the present invention include:
  Simple user gestures that do not require huge mouse/cursor
    moves.

Common or suggested relationship types shown in the prompts. This acts as a diagram assistant to hint to the user the type of relationships he most likely wants to create.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
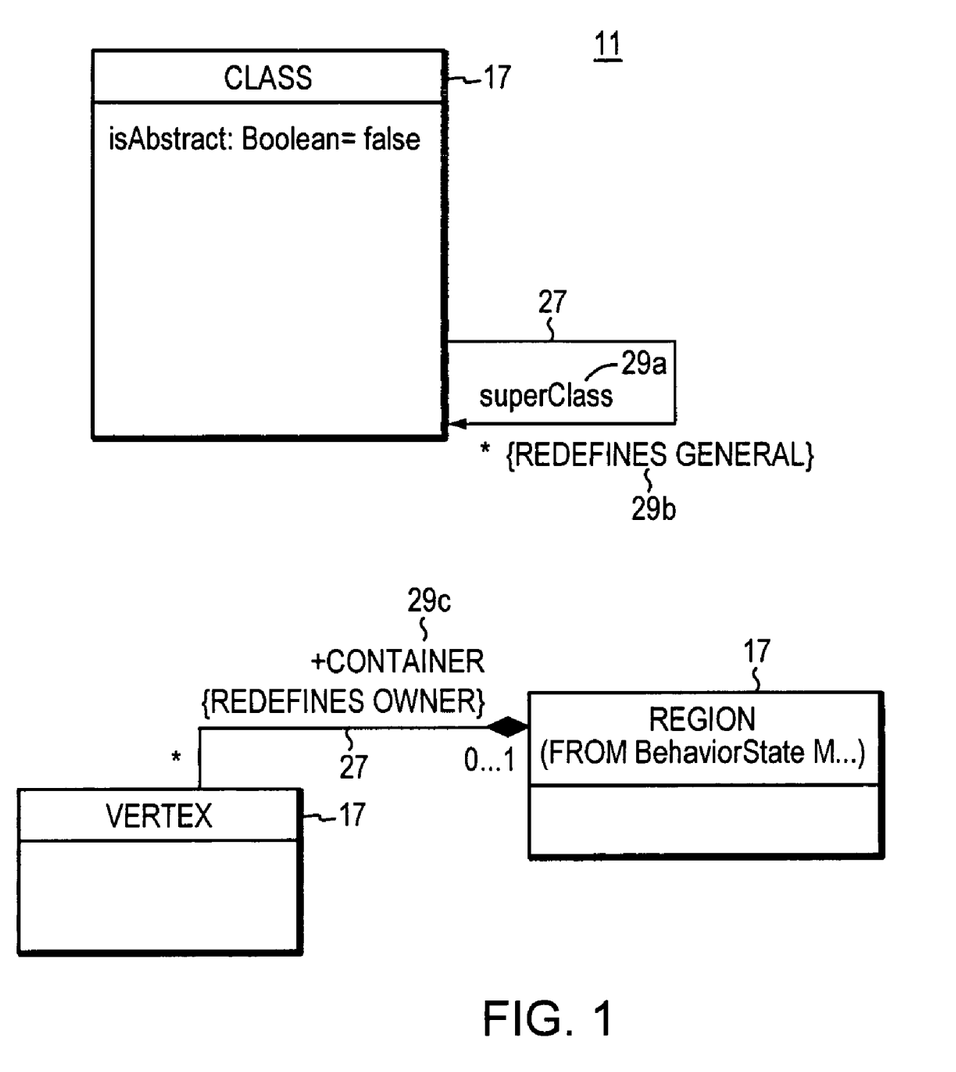
FIG. 1 is a schematic view of an example visual modeling diagram.

Illustrated in FIG. 1 is an example UML diagram 11 providing a model representation of a software program under design and/or consideration. Squares and other box-like shapes (or generally, model elements) 17 represent program elements such as classes and object instances of classes. Lines connecting the various shapes indicate relationships and constraints between program elements. These lines are referred to (in the art) as "connectors" 27. Properties 29 of the classes and object instances are also indicated along the connectors 27.

More formally, a relationship is a connection between model elements. A UML relationship is a type of model element that adds semantics to models. A user can add and modify relationships in models to identify the semantic ties between model elements 17.

Figure 2:
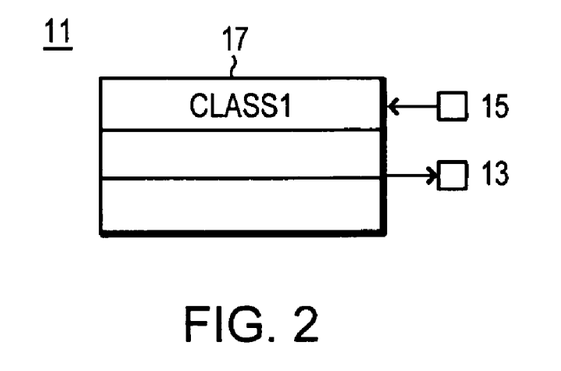
FIG. 2 is a schematic view of the present invention connector handles in a preferred embodiment.

In a modeling application, a user drags and drops visual modeling (UML) elements from a palette to a working diagram. In a preferred embodiment of the present invention, two connector handles 13, 15 appear when a user hovers over a shape in a working diagram 11. FIG. 2 is illustrative. The connector handles 13, 15 appear on the outside edge of the shape 17 nearest to where the mouse cursor is. One handle 13 is used for gestures involving outgoing connections (source to target creation), and the other handle 15 is used for gestures involving incoming connections (target-to-source creation). If the shape 17 represents a program element that does not support any of the use cases for a particular handle (outgoing 13 or incoming 15) then that connector handle does not appear. The handles 13, 15 disappear after a certain amount of time has passed in which there is no further user response.

Figure 3:
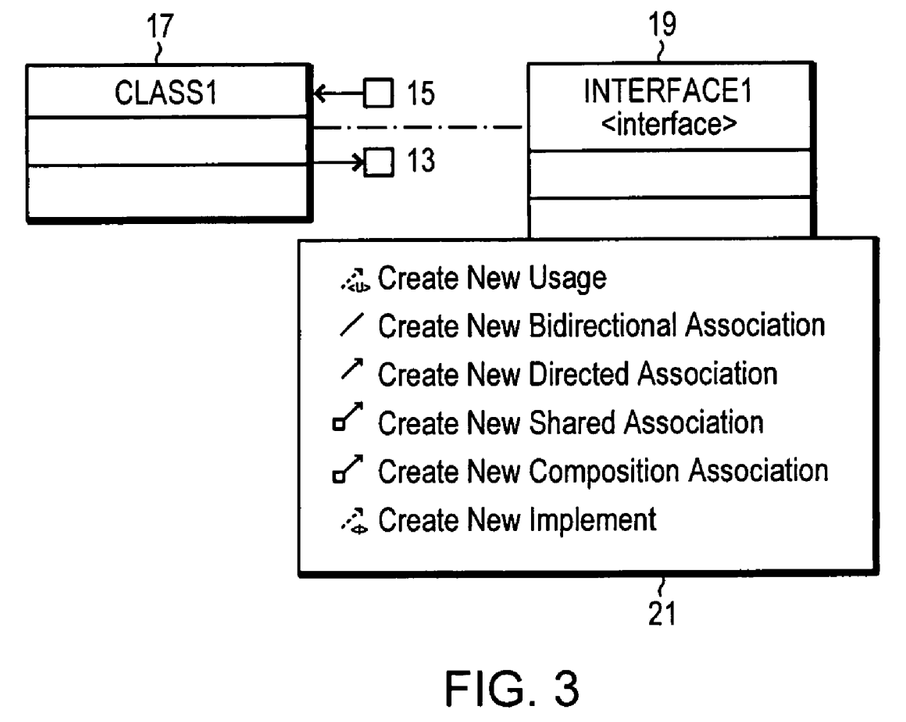
FIG. 3 is a schematic view of source to target connection creation in the embodiment of FIG. 2.

The user creates a new relationship between a source element 17 and target element 19 by selecting the outgoing connector handle 13 on the source shape 17 and dragging the selected connector handle 13 to the target shape 19 as shown in FIG. 3. When the mouse (cursor controller) is released, a popup or similar menu 21 appears prompting the user to select the type of relationship he wishes to create from the source element 17 to the target element 19.

In a like manner by selecting the incoming connector handle 15 of FIG. 2, the user creates a relationship from a target element to subject element 17. After selecting incoming connector handle 15, the user drags the connector handle 15 to a desired model element such as 19 in FIG. 3. When the mouse (cursor controller) is released, a popup menu or the like 21 appears prompting the user to select the type of relationship he wants to create from model element 19 (serving as the source) to subject element 17 (serving as the target here).

Figures 4, 5:
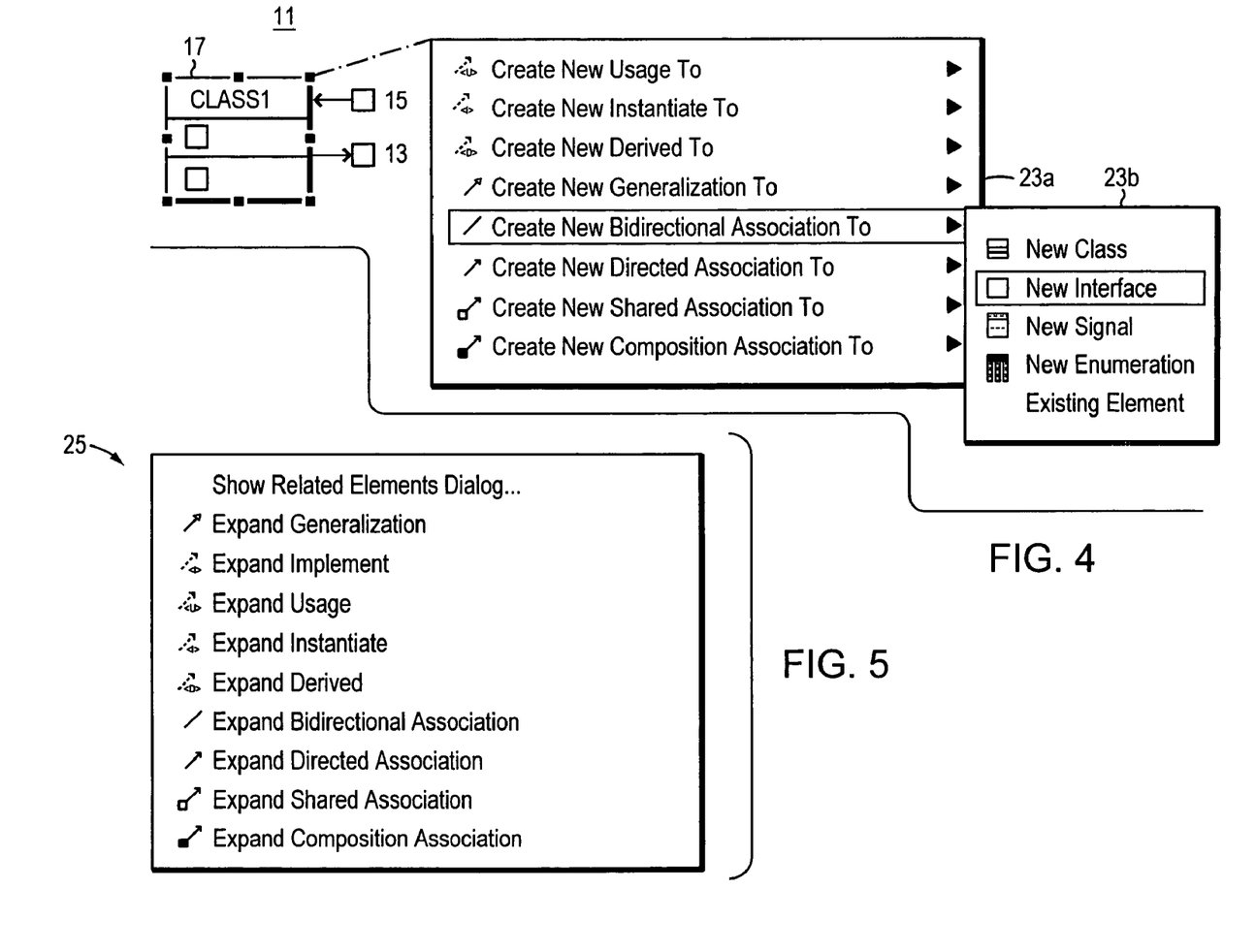
FIG. 4 is a schematic view of connection creation with an unspecified target end in the embodiment of FIG. 2.
FIG. 5 is a schematic illustration of expansion of related elements in a preferred embodiment.

Continuing with FIG. 2, and further illustrated in FIG. 4, the user creates a new relationship from source element 17 to an unspecified target by selecting outgoing connector handle 13 on the source shape 17 and dragging outgoing connector handle 13 to a blank space/area on the diagram 11. Similarly, the user can select incoming connector handle 15 on subject shape 17 and drag the selected connector handle 15 to a blank space/area of diagram 11 to create a new relationship from an unspecified source to subject element 17 (acting as the target of the operation here). In either case, when the user releases the mouse (cursor controller) a popup or similar series of menus 23*a, b* is displayed and prompts the user to (i) select the type of relationship he wishes to create and (ii) either create a new element or select an existing element for the unspecified end of the subject relationship.

As illustrated in FIGS. 3 and 4, the popup menus 21, 23*a, b* and prompts list or otherwise show common or suggested relationship types. This effectively serves as a diagram 11 assistant that provides to the user hints of the type of relationship he most likely wants to create at that time. Upon user selection from menus 21, 23*a, b*, the invention system produces and displays in working diagram 11 a connection 27 that is representative of the user-defined (user selected) newly created relationship between subject elements 17, 19.

Once a relationship is created between elements in a working diagram 11, the present invention enables a user to expand the related elements. In a preferred embodiment, the user expands related elements by double-clicking a connector handle 13, 15 and qualifying the relationship type through a displayed dialogue box 25. FIG. 5 shows an example related elements dialogue box 25 or menu from which the user makes a selection to expand the subject related elements.

Figure 6:
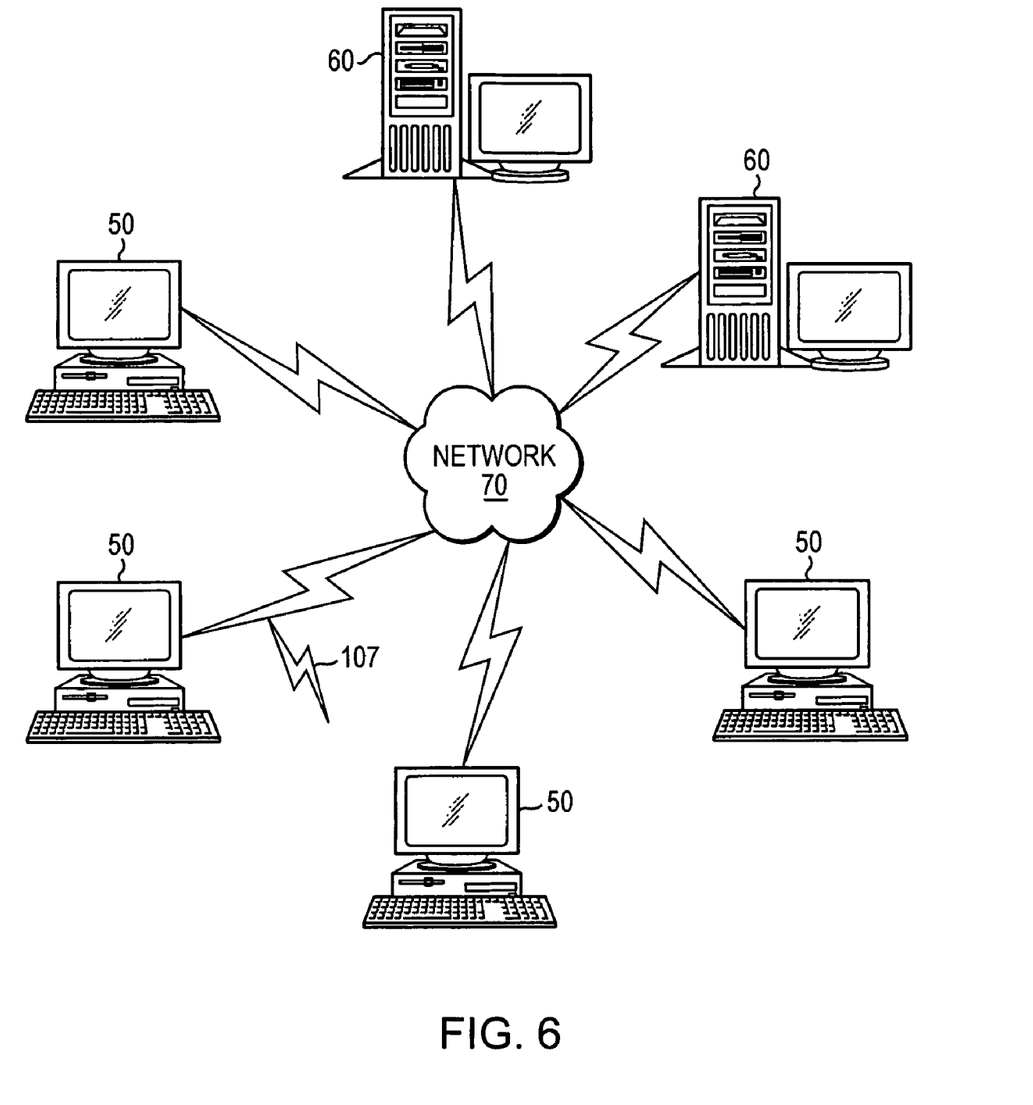
FIGS. 6 and 7 are schematic and block diagrams, respectively, of a computer network environment in which embodiments of the present invention may be deployed.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
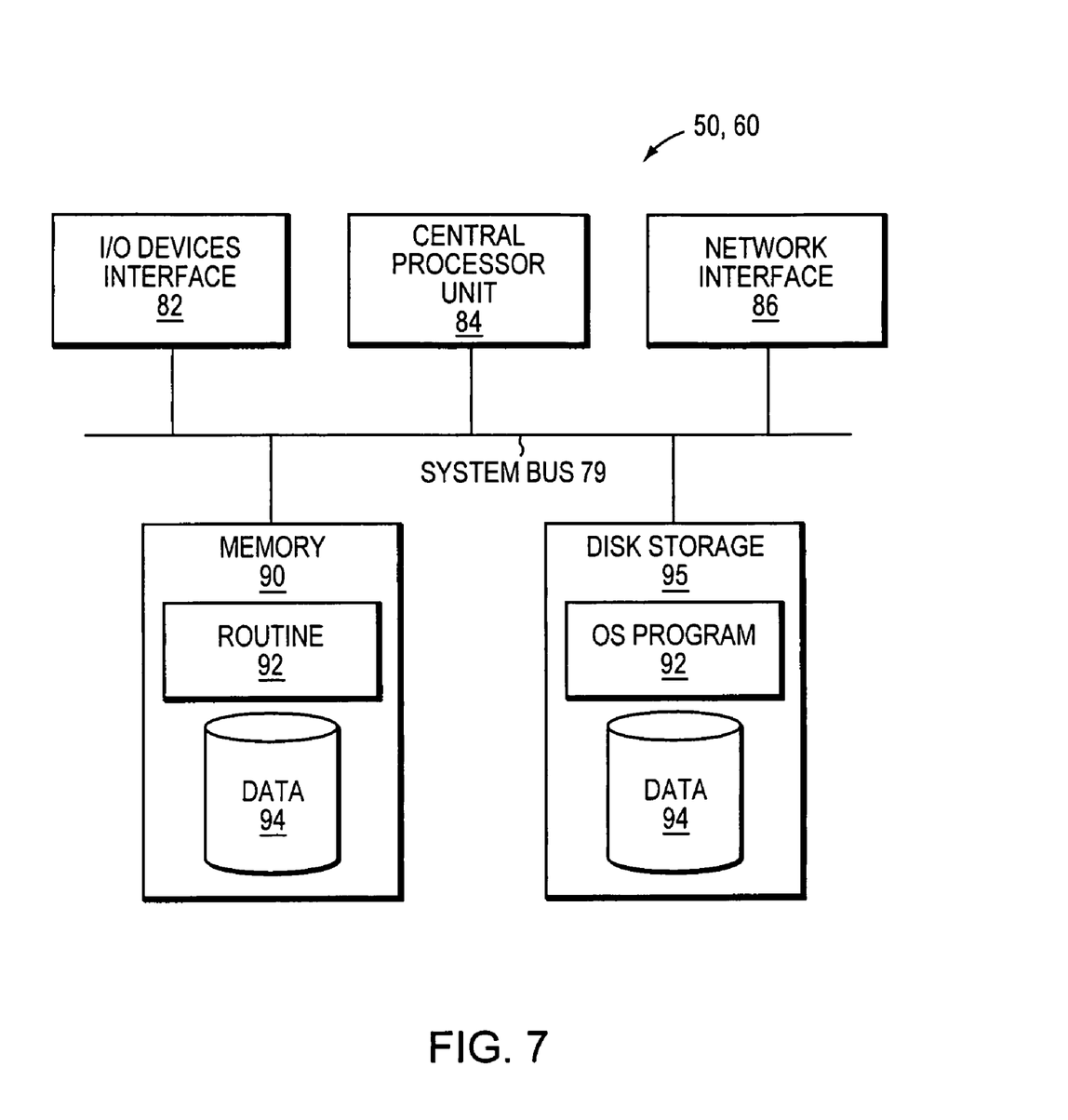

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., modeling application process/routine 10, diagram 11, connector handles 13, 15 and supporting prompts/menus 21, 23, 25 detailed above and further outlined in FIG. 8 below). Disk storage 95 provides non-volatile storage for computer software instructions 92 and data 94 used to implement an embodiment of the present invention. Central processor unit 84 is also attached to system bus 79 and provides for the execution of computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
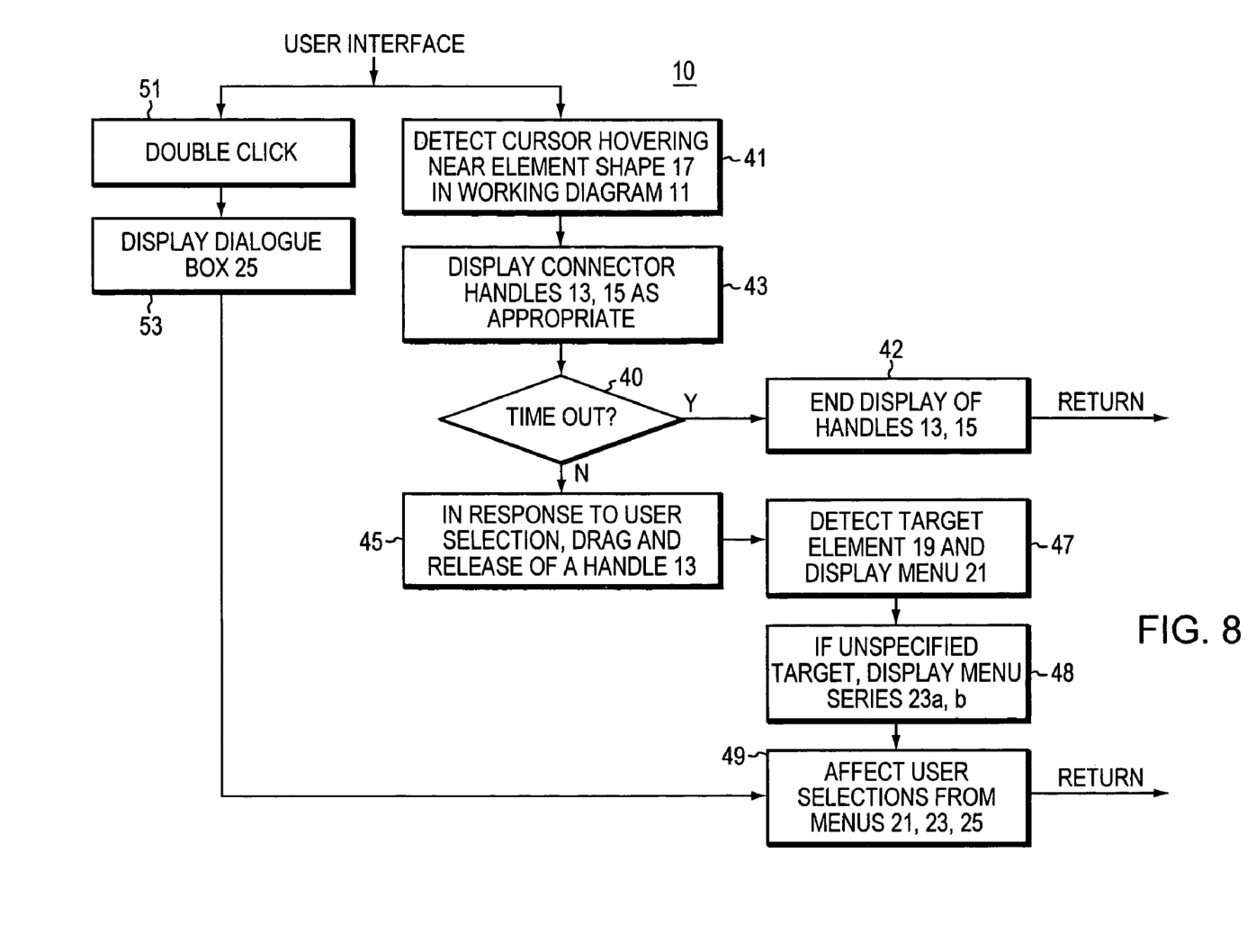
FIG. 8 is a flow diagram of the preferred embodiment

With reference to FIG. 8, the portion of the modeling application user interface germane to the present invention is presented in process outline fashion. As part of or a routine 10 for a modeling application user interface, the present invention begins with step 41. At step 41 the invention routine 10 detects the cursor hovering near an element shape 17 in the working diagram 11. Upon detection of the cursor hovering near element shape 17, the routine 10 displays connector handles 13 and 15 (step 43) as appropriate for the type of element 17. Routine 10 maintains the display of connector handle(s) 13 and 15 for a predetermined (threshold) amount of time. If the threshold amount of time is reached at step 40 without further user interaction with displayed handles 13 and 15, then step 42 ends the display of connector handles 13 and 15 and returns to the main user interface. If the user interacts with displayed handles 13 and 15 before the timeout (threshold time) is reached in step 40, then step 45 responds to user selection of one of the connector handles 13, 15. In particular, in response to user selection, dragging and releasing a connector handle 13., 15 via operation of an input device (mouse and mouse clicks), then step 45 initiates steps 47 through 49.

In step 47, invention routine 10 detects target element 19 and displays menu 21. If the target element is unspecified, then step 48 displays the menu series 23a, 23b to prompt the user to specify a target as previously discussed in FIG. 4. Menus 21, 23a and 23b may be held in a data store of prepared menus. Steps 47 and 48 hay use various data store retrieval techniques based on detected target element 19, user heuristics, working diagram 11 variables and the like to obtain menus 21, 23a and 23b accordingly. Next step 49 effects the user selections made from menus 21, 23 in steps 47 and/or 48 and returns to the main user interface. In particular, step 49 results in display of a connection that is representative of the user defined relationship between source element 17 and target element 19 in working diagram 11.

In step 51, invention routine 10 detects the user selecting through an input device (such as double clicking on a mouse) a connector handle 13, 15 of existing related elements displayed in working diagram 11. In response, step 53 displays a dialog box 25 as described in FIG. 5 above so as to prompt the user to qualify the relation type to expand the subject related elements. In response to user selection from dialog box 25, step 49 effects the user selection and returns to the main user interface.

While this invention has been particularly shown and described with references to preferred embodiments thereof, it will be understood by those skilled in the art that various changes in form and details may be made therein without departing from the scope of the invention encompassed by the appended claims.

For example, the present invention may be employed by or included in the user interface of a variety of modeling application such as Argo UML and others. The basic portions of the user interface (outside of the present invention portion) are believed to be in the purview of those skilled in the art.

Further the computer architecture of FIGS. 6 and 7 are for purposes of illustration and not limitation. Other computer architecture, network configurations, platforms and the like are suitable for the present invention.

What is claimed is:

1. A method of visual modeling a software program comprising computer implemented steps of:
   in a graphical user interface, providing indications of both a potential source-to-target connection and a potential target-to-source connection, said providing including displaying together a source-to-target handle and a target-to-source handle in response to cursor hovering near any one of a plurality of model elements as displayed in a work diagram, the source-to-target handle being generic across different types of relationships between model elements and for producing a source-to-target connection between two model elements, and the target-to-source handle being generic across different types of relationships between model elements and for producing a target-to-source connection between two model elements, the work diagram modeling a subject software program and being formed of the plurality of model elements; and in response to a user selecting one of the displayed source-to-target handle and the target-to-source handle, producing a respective connection and prompting the user to qualify the produced connection with respect to the one displayed model element and there from defining a relationship with the one displayed model element in the work diagram, such that after user qualifying, the produced connection becomes one specific connection type of many different connection types and representing one of the different types of relationships; and displaying the produced connection as a representation of the defined relationship in the work diagram.

2. A method as claimed in claim 1 wherein the step of providing causes, as appropriate for the one displayed model element, one or both of the source-to-target handle and the target-to-source handle to appear to hover nearest to the cursor on an edge of the one displayed model element.

3. A method as claimed in claim 1 wherein the user selecting one of the displayed handles includes the user indicating a target context, and the step of prompting includes enabling the user to specify connection type based on the target context.

4. A method as claimed in claim 3 wherein the user indicated target context is a blank area of the work diagram, and
the step of prompting further includes enabling the user to specify target type.

5. A method as claimed in claim 1 wherein the step of prompting includes providing one or more menus of suggested relationships from which the user may select for the relationship with the one displayed model element.

6. A method as claimed in claim 1 further comprising the steps of:
continuing to display the user selected handle after the relationship between the one displayed model element and another element has been defined in the work diagram; and
in response to user subsequent selection of the continued displayed handle, providing menus enabling user expansion of the related elements.

7. A computer apparatus for visual modeling a software program comprising:
a work diagram executable by a processor programmed for visual modeling a software program, the work diagram displaying a model representation of the software program, the model representation being formed of a plurality of model elements; and
a hardware graphical user interface coupled to the work diagram and providing display of both a source-to-target handle and a target-to-source handle, together in response to cursor hovering near any one of the plurality of model elements as displayed in the work diagram, the source-to-target handle being generic across different types of relationships between model elements and for defining a respective connection between two model elements, the target-to-source handle being generic across different types of relationships between model elements and for defining a respective connection between two model elements, and
in response to user selection of one of the displayed source-to-target handle and the target-to-source handle, the graphical user interface (i) producing a respective connection with respect to the one displayed model element, (ii) prompting for user qualification of the produced connection, and (iii) defining from the user qualification a relationship with at least the one displayed model element as represented by the produced connection,
such that after user qualification, the produced connection becomes one specific connection type of many different connection types and representing one of the different types of relationships.

8. Computer apparatus as claimed in claim 7 wherein the graphical user interface displays one or both of the handles as appropriate for the one displayed model element, and for each displayed handle, displays the handle on an edge of the one displayed model element nearest to the cursor.

9. Computer apparatus as claimed in claim 7 wherein user selection of the one handle includes the user indicating a target context, and the graphical user interface prompting includes enabling the user to specify connection type based on the target context.

10. Computer apparatus as claimed in claim 9 wherein the user indicated target context is a blank area of the work diagram, and
the graphical user interface prompting further includes enabling the user to specify target type.

11. Computer apparatus as claimed in claim 7 wherein the graphical user interface prompting utilizes one or more menus.

12. Computer apparatus as claimed in claim 11 wherein one menu indicates suggested relationship types for the one displayed model element.

13. Computer apparatus as claimed in claim 7 wherein the graphical user interface further:
continues to display the user selected handle after the relationship between the one displayed model element and another element has been defined in the work diagram; and
in response to user subsequent selection of the continued displayed handle, provides menus enabling user expansion of the related elements.

14. A computer system for visual modeling a software program comprising:
a processor and a memory coupled to the processor;
work diagram means executable by the processor and for displaying a model representation of a software program, the model representation being formed of a plurality of model elements as displayed; and
user interface means coupled to the work diagram means, for providing display of both a source-to-target handle and a target-to-source handle together in response to cursor hovering near any one of the plurality of model elements as displayed by the work diagram means, the source-to-target handle being generic across different types of relationships between model elements and for defining a respective connection between two model elements, the target-to-source handle being generic across different types of relationships between model elements and for defining a respective connection between two model elements, and
in response to user selection of one of the displayed source-to-target handle and the target-to-source handle, the user interface means (i) producing a respective connection with respect to the one displayed model element, (ii) prompting for user qualification of the produced connection, and (iii) defining from the user qualification a relationship with at least the one displayed model element as represented by the produced connection,
such that after user qualification, the produced connection becomes a specific connection type, the specific connection type being one of many different connection types and representing one of the different types of relationships.

15. A computer system as claimed in claim 14 wherein user selection of the one handle includes the user indicating a target context, and the user interface means prompting includes menu means enabling the user to specify connection type based on the target context.

16. A computer system as claimed in claim 15 wherein the user indicated target context is a blank area of the model representation, and
the user interface means prompting further includes menu means enabling the user to specify target type.

17. A computer system as claimed in claim 14 wherein the user interface means further:
continues to display the user selected handle after the relationship between the one displayed model element and another element has been defined in the model representation; and
in response to user subsequent selection of the continued displayed handle, provides menu means enabling user expansion of the related elements.

18. A computer system as claimed in claim 14 wherein the user interface means prompting utilizes a series of one or more menus.

19. A computer program product comprising:
a non-transitory computer readable storage medium having a computer readable program embodied therewith, wherein the computer readable program when executed on a computer causes the computer to:
provide display of both a source-to-target handle and a target-to-source handle together in response to cursor hovering near any one of a plurality of model elements displayed in a work diagram, the work diagram modeling a subject software program and being formed of the plurality of model elements, the source-to-target handle being consistent across different types of relationships between model elements and for producing a source-to-target connection between two model elements, and the target-to-source handle being consistent across different types of relationships between model elements and for producing a target-to-source connection between two model elements displayed in the work diagram; and
in response to a user selecting one of the displayed source-to-target handle and the target-to-source handle, (i) produce a respective connection in the work diagram, (ii) prompt the user to qualify the produced connection with respect to the one displayed model element and (iii) from user's response to qualify, define a relationship for the one displayed model element in the work diagram, the relationship being represented by the produced connection,
such that after user qualifying, the produced connection becomes one specific connection type of many different connection types and representing one of the different types of relationships.

20. A computer program product as claimed in claim 19 wherein the prompts include providing menus of suggested relationships.

* * * * *